United States Patent
Martinez Acosta et al.

(10) Patent No.: US 12,181,041 B2
(45) Date of Patent: Dec. 31, 2024

(54) ZERO TURNING RADIUS MOWER PARK BRAKE SYSTEM

(71) Applicant: DEERE & COMPANY, Moline, IL (US)

(72) Inventors: Josean J. Martinez Acosta, Raleigh, NC (US); Thomas M. Messina, Holly Springs, NC (US); Kenneth M. Reep, Lincolnton, NC (US); William P. Johnson, Cary, NC (US); David W. Geiger, Raleigh, NC (US); Margaret K. Martin, Raleigh, NC (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/047,336

(22) Filed: Oct. 18, 2022

(65) Prior Publication Data
US 2024/0125385 A1 Apr. 18, 2024

(51) Int. Cl.
*A01D 34/82* (2006.01)
*F16H 63/34* (2006.01)

(52) U.S. Cl.
CPC ....... *F16H 63/3416* (2013.01); *A01D 34/824* (2013.01); *A01D 34/828* (2013.01)

(58) Field of Classification Search
CPC .... A01D 34/824; A01D 34/828; A01D 69/10; B62D 11/08
See application file for complete search history.

(56) References Cited

U.S. PATENT DOCUMENTS

| | | | |
|---|---|---|---|
| 3,679,015 A * | 7/1972 | Shriver | B62D 11/08 74/471 R |
| 6,056,074 A | 5/2000 | Heal et al. | |
| 6,301,864 B1 | 10/2001 | Damie et al. | |
| 6,434,917 B1 * | 8/2002 | Bartel | A01D 34/64 56/14.7 |
| 6,729,115 B2 | 5/2004 | Bartel | |
| 6,739,116 B2 | 5/2004 | Stover et al. | |
| 6,886,677 B2 | 5/2005 | Rupiper et al. | |
| 7,299,610 B2 | 11/2007 | Piontek | |
| 7,340,890 B1 | 3/2008 | Poplawski et al. | |
| 7,451,865 B2 | 11/2008 | Eavenson, Sr. et al. | |
| 7,458,432 B2 | 12/2008 | Mayer et al. | |
| 7,634,953 B2 | 12/2009 | Hoffman et al. | |
| 7,677,371 B2 | 3/2010 | Dong et al. | |
| 7,686,108 B2 | 3/2010 | Piontek | |
| 8,210,324 B2 | 7/2012 | Blanchard | |
| 8,235,151 B2 | 8/2012 | Nunez et al. | |
| 8,240,420 B1 | 8/2012 | Bartel et al. | |
| 8,323,153 B2 | 12/2012 | Deblack et al. | |
| 8,485,065 B2 | 7/2013 | Blanchard | |
| 8,573,368 B2 | 11/2013 | Stover et al. | |
| 8,857,558 B2 | 10/2014 | Poe | |

(Continued)

*Primary Examiner* — Charles A Fox
*Assistant Examiner* — Gregory T Prather

(57) ABSTRACT

A zero turning radius mower park brake system includes a park brake pawl on a transmission which engages a park brake to a pair of independently driven traction wheels. A park brake link may be pivotably mounted to the park brake pawl and connected to a left steering lever and a right steering lever. The park brake link may pivot while moving the park brake pawl forward to a park brake engaged position if only one of the steering levers is moved outward from a neutral traction drive position.

11 Claims, 4 Drawing Sheets

(56) References Cited

U.S. PATENT DOCUMENTS

| | | | |
|---|---|---|---|
| 9,313,953 B2 | 4/2016 | Borshov et al. | |
| 9,650,024 B2 | 5/2017 | Weihl | |
| 9,885,416 B2 | 2/2018 | Blanchard | |
| 10,690,230 B2 | 6/2020 | Teillet | |
| 2006/0096791 A1* | 5/2006 | Sueshige | B62D 11/006 |
| | | | 180/6.48 |
| 2008/0296107 A1 | 12/2008 | Porter et al. | |
| 2019/0274251 A1* | 9/2019 | Dunbar | B60T 7/102 |
| 2020/0269917 A1* | 8/2020 | Welz | A01D 34/824 |

* cited by examiner

ZERO TURNING RADIUS MOWER PARK BRAKE SYSTEM

FIELD OF THE INVENTION

This invention relates to grass mowing machines, and specifically to zero turning radius ("ZTR") mowers having independently powered left and right drive wheels controlled by a pair of steering arms.

BACKGROUND OF THE INVENTION

Grass mowing machines known as zero turning radius ("ZTR") mowers have at least one independently powered drive wheel on each side of a frame. One drive wheel may be operated in a forward direction while the other drive wheel may be stopped or operated in reverse. Many ZTR mowers have a twin stick control system. A pair of steering arms or control levers may be provided side-by-side, with each steering arm controlling one of the drive wheels. When both steering arms or control levers are advanced together forwardly out of their neutral position, both drive wheels rotate forwardly to cause the mower to move forward. A ZTR mower may be steered by advancing one steering arm or control lever more than the other.

Typically, each steering arm or control lever on a ZTR mower may be linked to a pump arm of one of two separate hydraulic pumps, or of a dual hydraulic pump; i.e., a separate pump for each wheel. The steering arm or control lever may be used to move a pump swash plate through a direct linkage.

The steering arms or control levers on a ZTR mower may be mounted on the vehicle frame so that each has a first pivot axis allowing the steering arm or control lever in the operating position to pivot forwardly in an arc to turn the wheel in forward, or pivot rearwardly to turn the wheel in reverse. Additionally, when a steering arm or control lever is in neutral, between forward and reverse, the operator may pivot it outwardly on a second pivot axis. The ZTR mower may stay in neutral when the steering arms or control levers are pivoted outward.

Some ZTR mowers have mechanisms to engage park brakes when the steering arms or control levers are pivoted outward from the neutral position. For example, U.S. Pat. Nos. 6,434,917 and 6,729,115 for Mower with Combined Steering and Brake Levers relates to linkages connected between each steering lever and brake mechanism, which engages or releases a park brake when the steering lever is moved outward from then neutral position. U.S. Pat. No. 6,739,116 for Powered Actuator System for Mower Parking Brake System relates to an electrically powered actuator system that includes a solenoid that may be de-energized or energized to engage or disengage the parking brake. U.S. Pat. No. 7,677,371 for Mower With Automatic Parking Brake relates to a hydraulic parking brake actuator that senses the position of the steering lever and controls a valve for high pressure fluid to flow to the actuator to disengage the parking brake. U.S. Pat. No. 7,686,108 for Electrically Released parking Brake for Zero Turn Radius Mower relates to switches that allow air cylinders to exhaust pressurized air so that tension springs may actuate the brakes. U.S. Pat. No. 8,240,420 for Steering Mechanism relates to a sensor for activating parking brakes for sensing the lever assembly when it is in the outboard position. U.S. Pat. No. 8,573,368 for Motor Driven Parking Brake Actuator System for Mower relates to an electric motor that drives a gear reduction assembly rotating an output shaft linked to the parking brakes. U.S. Pat. No. 9,313,953 for Parking Brake System for a Lap Bar Controlled Zero Turn Radius Mower relates to an actuation assembly with a rotatable push arm connected to the lower end of each lap bar, and is spaced apart from a rotatable pedal arm in a disengaged position, and in contact in an engaged position.

In the past, each park brake cable or linkage was connected from a steering arm or control lever to an individual transmission for each traction drive wheel of a ZTR mower. However, some ZTR mowers now use an electrical transmission with a single lever to apply the park brake. With such a transmission, both park brake cables or linkages (one connected to each steering arm or control lever) may be used to activate the brake. If the cables are attached directly to each steering arm or control lever, slack would result in the second cable if only the first steering arm is moved outward from the neutral to the park position. This may result in problems or malfunctions of the park brake system. Additionally, high force may be needed to move one steering arm or control lever at a time to engage the parking brake, or little or no force may be needed to move the other steering arm or control lever.

A zero turning radius mower park brake system is needed that allows either steering arm or control lever to activate or engage the park brake. A zero turning radius mower park brake system is needed that prevents slack in the second cable if only a first steering arm or control lever is moved outward to the park position. A zero turning radius mower park brake system is needed that allows an operator to use the same or substantially the same force to move each steering arm or control lever to the park position, at the same time or by itself.

SUMMARY OF THE INVENTION

A zero turning radius mower park brake system having a left cable and a right cable connecting a left steering arm and a right steering arm to a park brake link biased to a park brake disengaged position. A park brake pawl is pivotably mounted to the park brake link. Each steering arms is movable outward to pull on one of the cables and slide the park brake link forward to pivot the park brake pawl to a park brake engaged position.

DESCRIPTION OF THE PREFERRED EMBODIMENT

Figure 1:
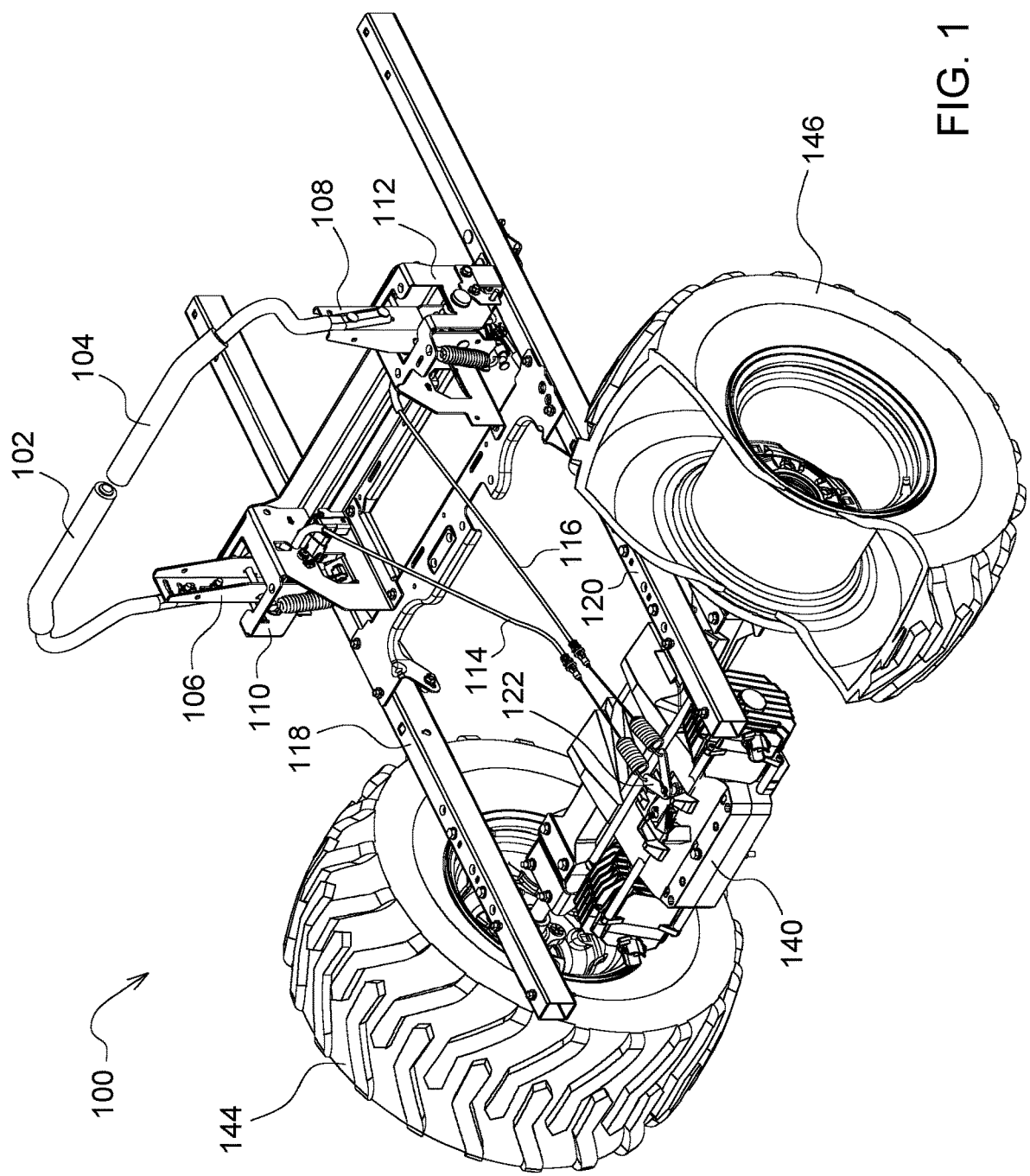
FIG. 1 is a perspective view of a zero turning radius mower park brake system according to a first embodiment of the invention.

As shown in FIG. 1, a first embodiment of zero turning radius mower park brake system 100 may be on a ZTR mower having left and right steering arms or control levers 102, 104. The left and right steering arms or control levers may be attached to left and right steering arm brackets 106, 108, which may be pivotably mounted to left and right housings 110, 112 on left and right frame members 118, 120. The ZTR mower may have a rear mounted engine behind the operator platform, and a mower deck mounted below and forwardly of the operator platform. The operator may move each steering arm or control lever fore and aft to individually control the speed of each of a pair of rear traction drive wheels 144, 146 in forward or reverse. The steering arms or control levers may be placed in the neutral position between forward and reverse, where they may be moved outward to apply a park brake. Left and right cables 114, 116 may connect each steering arm or control lever to park brake link 122. For example, the cables may be Bowden cables.

Figure 2A:
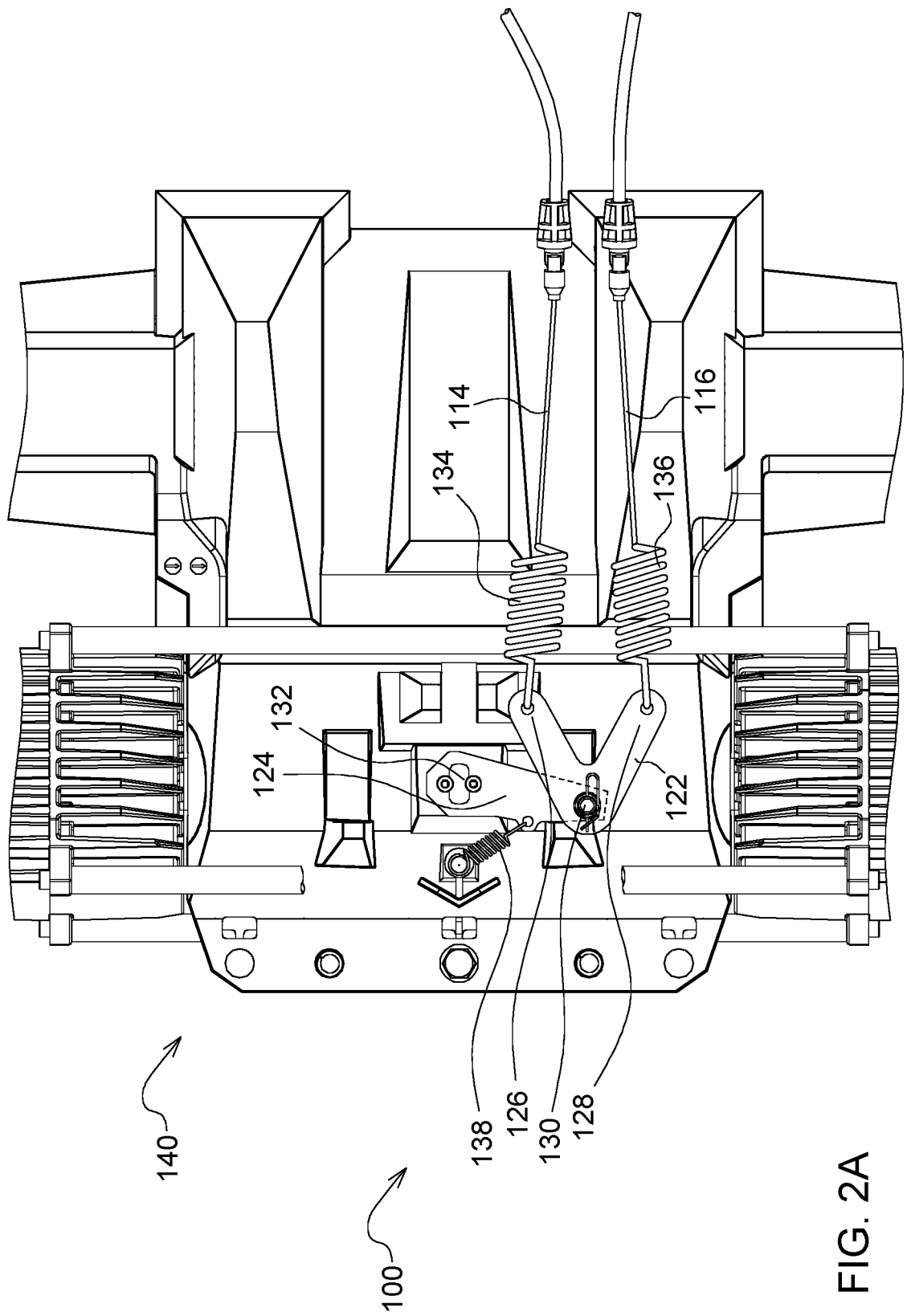
FIG. 2A is a top view of a zero turning radius mower park brake system according to a first embodiment of the invention with the park brake disengaged.

FIG. 2A shows an embodiment of the zero turning radius mower park brake system with the park brake disengaged. Park brake link 122 may be a V-shape bracket. The park brake link may have left and right legs 126, 128, and center pivot axis 130 between the left and right legs. Left cable 114 may connect left steering arm or control lever 104 to left leg 126, and right cable 116 may connect right steering arm or control lever 105 to right leg 128. The cable connections also may include tension springs 134, 136. Coil spring 138 may bias the park brake link rearward to the disengaged position of FIG. 1. Park brake pawl 124 may be pivotably connected to park brake link 122. Park brake pawl 124 may be a single lever on an upper panel of electrical transmission 140 and may be used to actuate a park brake. For example, the park brake pawl may pivot in a counterclockwise direction to apply an internal single friction brake to both left and right traction drive wheels 134, 136.

Figure 2B:
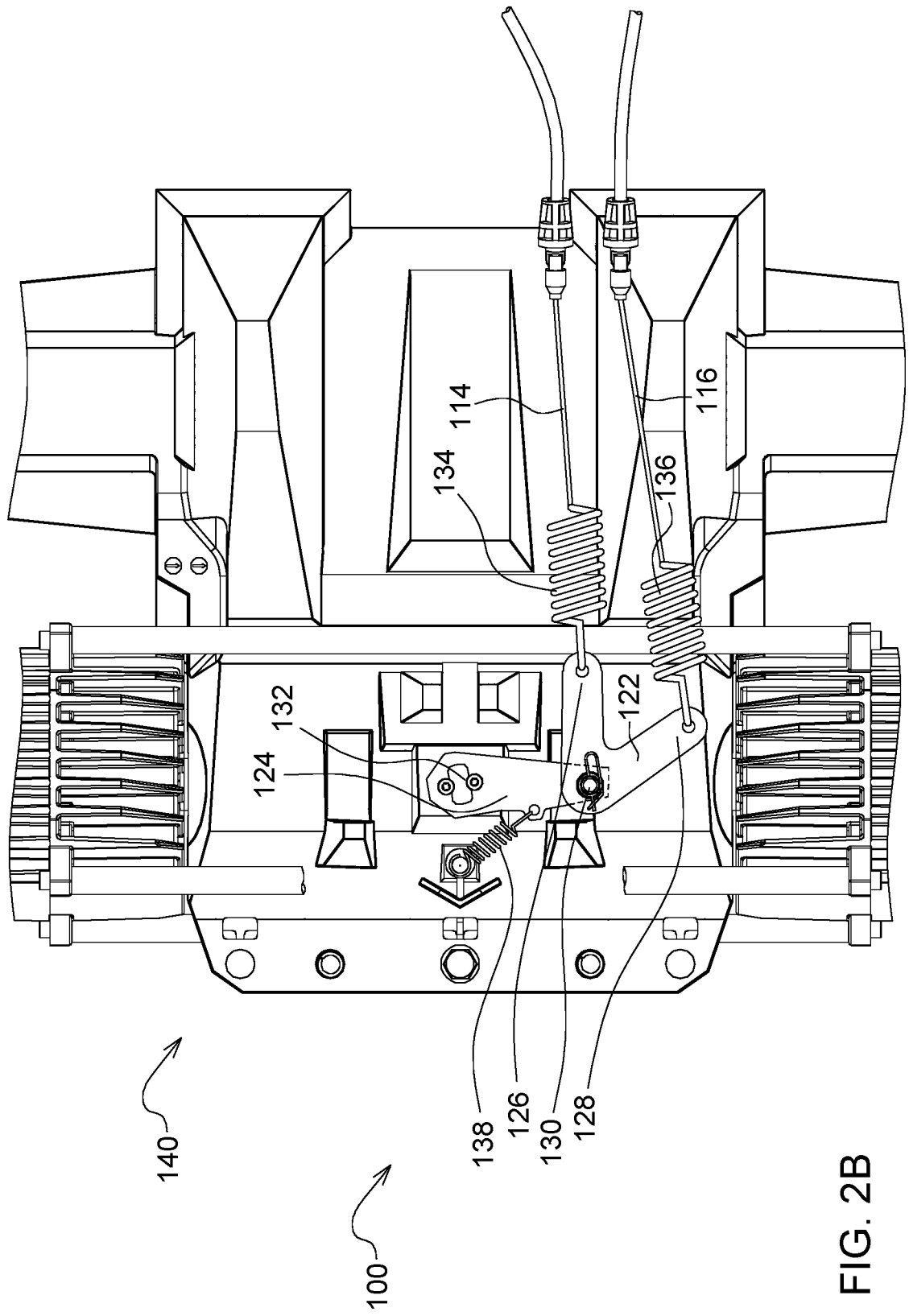
FIG. 2B is a top view of a zero turning radius mower park brake system according to a first embodiment of the invention with the park brake partially engaged.

FIG. 2B shows an embodiment of the zero turning radius mower park brake system with the park brake engaged by moving one of the steering arms or control levers outward. For example, if the operator moves the left steering arm or control lever outward to the park position, the steering arm pulls on cable 114 attached to leg 126 of park brake link 122. Cable 114 may pull leg 126 forward, forcing park brake link 122 to slide forward as the park brake link pivots clockwise on center pivot axis 130. Left leg 126 may be parallel or nearly parallel to left cable 114. The forward movement of park brake link 122 causes park brake pawl 124 to pivot counterclockwise to an engaged park brake position, as shown in FIG. 2B. The park brake link may pivot while sliding forward if the operator moves only one steering arm or control lever outward, or moves one steering arm or control lever substantially move than the other.

In one embodiment of the zero turning radius mower park brake system, the operator may move a first steering arm or control lever outward to the park position, and then may move the second steering arm or control lever outward. The second steering arm or control lever may pull on cable 116 attached to leg 128 of park brake link 122. Cable 116 may pull leg 128 forward, forcing park brake link 122 to slide further forward while pivoting counterclockwise on center pivot axis 130. The additional forward movement of park brake link 122 causes park brake pawl 124 to pivot further counterclockwise to a fully engaged park brake position, as shown in FIG. 2C.

Figure 2C:
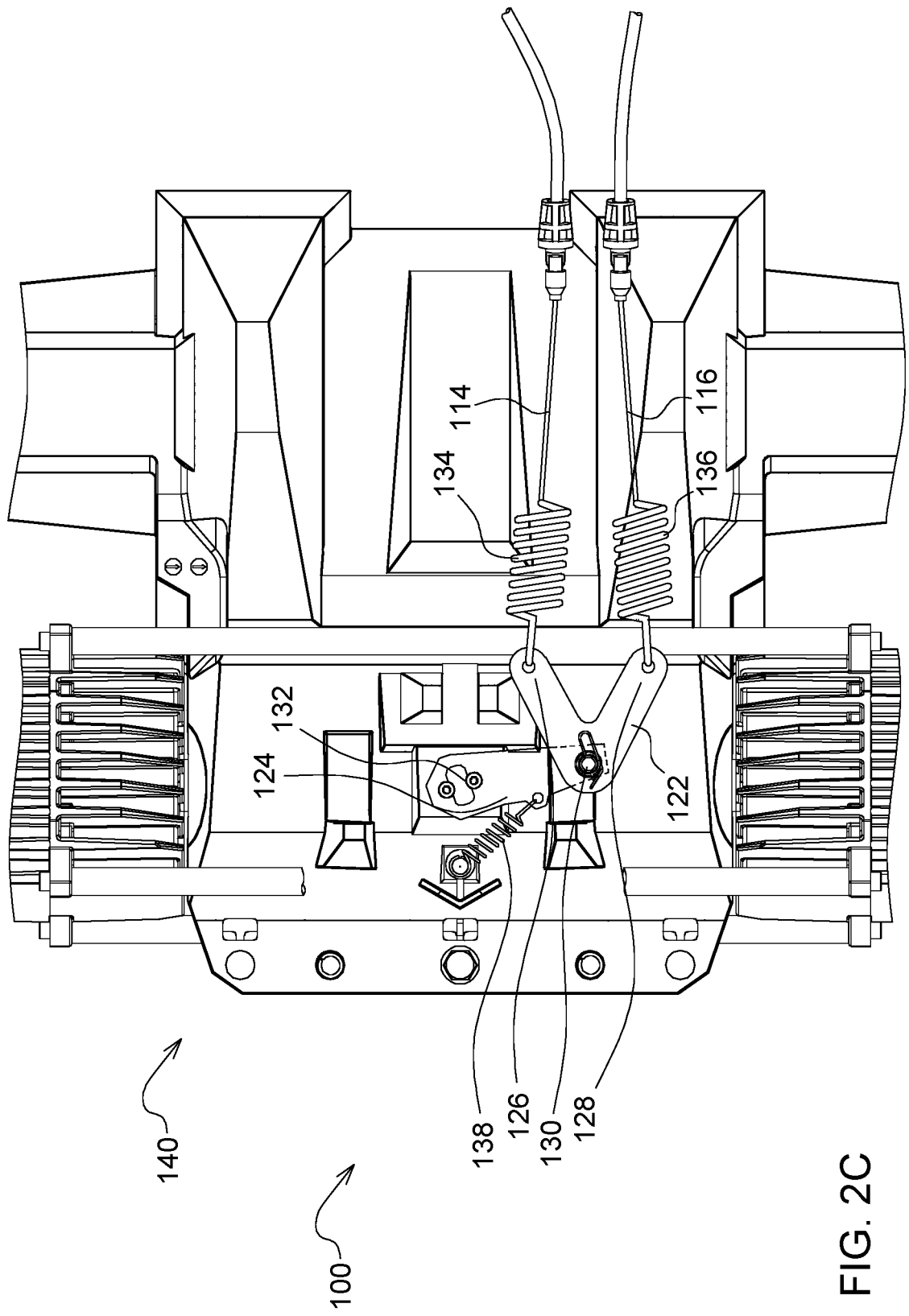
FIG. 2C is a top view of a zero turning radius mower park brake system according to a first embodiment of the invention with the park brake fully engaged.

FIG. 2C shows an embodiment of the zero turning radius mower park brake system with the park brake fully engaged by moving both steering arms or control levers outward. The steering arms or control levers may pull on cables 114, 116 to move both legs 126, 128 and slide park brake link 122 forward. This causes park brake pawl 124 to pivot counter-clockwise to the fully engaged park brake position.

In one embodiment of the zero turning radius mower park brake system, the park brake may be engaged by moving either steering arm or control lever outward from the neutral traction drive position to the park position. Both steering arms or control levers may be returned from the outward position to disengage the park brake. The forces needed by the operator to engage the park brake are substantially similar if either steering lever is moved outward first or both steering levers are moved outward at the same time. The park brake link may rotate on its pivot axis to engage the park brake if only one of the steering levers is moved outward to the park position. The park brake link also may prevent slack in the cable connected to the other steering lever.

Having described the preferred embodiments, it will become apparent that various modifications can be made without departing from the scope of the invention as defined in the accompanying claims.

The invention claimed is:

1. A zero turning radius mower park brake system, comprising:
   a left cable and a right cable connecting a left steering arm and a right steering arm, respectively, to a park brake link which is biased to a park brake disengaged position;
   a park brake pawl pivotably mounted to the park brake link; and
   left and right traction drive wheels;
   the left steering arm movable outward to pull on the left cable and the right steering arm movable outward to pull on the right cable and slide the park brake link forward to a park brake engaged position which causes the park brake pawl to pivot;
   and wherein movement of one of the left steering arm and right steering arm outward is capable of sliding the park brake link forward to the park brake engaged position which causes the park brake pawl to pivot and apply a brake to each of said left and right traction drive wheels.

2. The zero turning radius mower park brake system of claim 1, wherein the park brake pawl is pivotably mounted to the park brake link on a center pivot axis.

3. The zero turning radius mower park brake system of claim 1, further comprising a tensioning coil spring between each of the cables and the park brake link.

4. The zero turning radius mower park brake system of claim 1, wherein the park brake link is a V-shaped bracket having a left leg connected to the left cable and a right leg connected to the right cable.

5. The zero turning radius mower park brake system of claim 4, wherein the park brake link pivots as it slides forward if only one of the steering arms pulls on one of the cables.

6. A zero turning radius mower park brake system, comprising:
   left and right traction drive wheels;
   a park brake link that is pivotably mounted on a zero turning radius mower;
   a pair of cables connected between a pair of steering arms and the park brake link;
   the park brake link pivoting as it is pulled forward by one of the cables connected to one of the steering arms causing application of a brake to both left and right traction drive wheels.

7. The zero turning radius mower park brake system of claim 6, wherein the park brake link pivots on a center axis between a left leg connected to a left cable and a right leg connected to a right cable of the pair of cables.

8. The zero turning radius mower park brake system of claim 6, further comprising a pair of tension springs between each of the pair of cables and the park brake link.

9. The zero turning radius mower park brake system of claim 6, wherein the park brake link is biased rearwardly.

10. A zero turning radius mower park brake system, comprising:
- a V-shaped park brake link having a right leg and a left leg and biased to a park brake disengaged position;
- a left cable connecting a left steering arm to the left leg of the V-shaped park brake link;
- a right cable connecting a right steering arm to the right leg of the V-shaped park brake link;
- a park brake pawl pivotably mounted to the park brake link;
- the left steering arm movable outward to pull on the left cable and the right steering arm movable outward to pull on the right cable and slide the V-shaped park brake link forward to a park brake engaged position which causes the park brake pawl to pivot.

11. The zero turning radius mower park brake system of claim 10, wherein the park brake link pivots as it slides forward if only one of the steering arms pulls on one of the cables.

* * * * *